United States Patent [19]

Townshend

[11] 4,351,045

[45] Sep. 21, 1982

[54] TRACKING ERROR MEASUREMENT

[76] Inventor: James M. Townshend, 32 Mayo Rd., Walton-on-Thames, Surrey, England

[21] Appl. No.: 166,447

[22] Filed: Jul. 7, 1980

[30] Foreign Application Priority Data

Jul. 5, 1979 [GB] United Kingdom ................. 7923545

[51] Int. Cl.³ ................................................ G11B 3/10
[52] U.S. Cl. ........................................ 369/55; 33/1 B
[58] Field of Search ............... 369/55, 56, 57; 33/1 B, 33/1 N, 180 R

[56] References Cited

U.S. PATENT DOCUMENTS

| 3,183,004 | 5/1965 | Miessner | 369/56 |
| 3,283,411 | 11/1966 | Steward | 369/55 |
| 3,493,234 | 2/1970 | Voss et al. | 369/55 |
| 3,528,077 | 9/1970 | Seiden | 33/1 B |

FOREIGN PATENT DOCUMENTS 104421 3/1917 United Kingdom ................. 33/1 N

Primary Examiner—John W. Shepperd
Attorney, Agent, or Firm—Browdy & Neimark

[57] ABSTRACT

Method and apparatus for obtaining a measure of or relating to lateral tracking error at each of a plurality of predetermined radial distances from the spindle axis of phonographic turntable equipment that includes a spindle (13), a rotatable platter (14), and a pivotally mounted tonearm (11) to carry a cartridge-mounted stylus (12) via a separate or integral headshell (16). The apparatus comprises an alignment protractor (20, 120) placed on the platter for arcuate movement about the spindle axis, and a device (30, 130, 40) mounted on the tonearm in place of the cartridge or both the cartridge and headshell. The alignment protractor (20) is marked with a plurality of equi-angularly spaced radial lines indicative of differing tracking error values and a plurality of equi-spaced transverse straight lines crossing all the radial lines and intersecting at right angles the radial line indicative of zero tracking error. The device (30, 40) is marked with a distance scale comprising a main line (35, 45) directed at the offset angle with respect to the tonearm and intersected by equi-spaced distance marks corresponding to and/or defining different stylus points (whereby each distance mark defines a different value for the stylus overhang distance).

14 Claims, 8 Drawing Figures

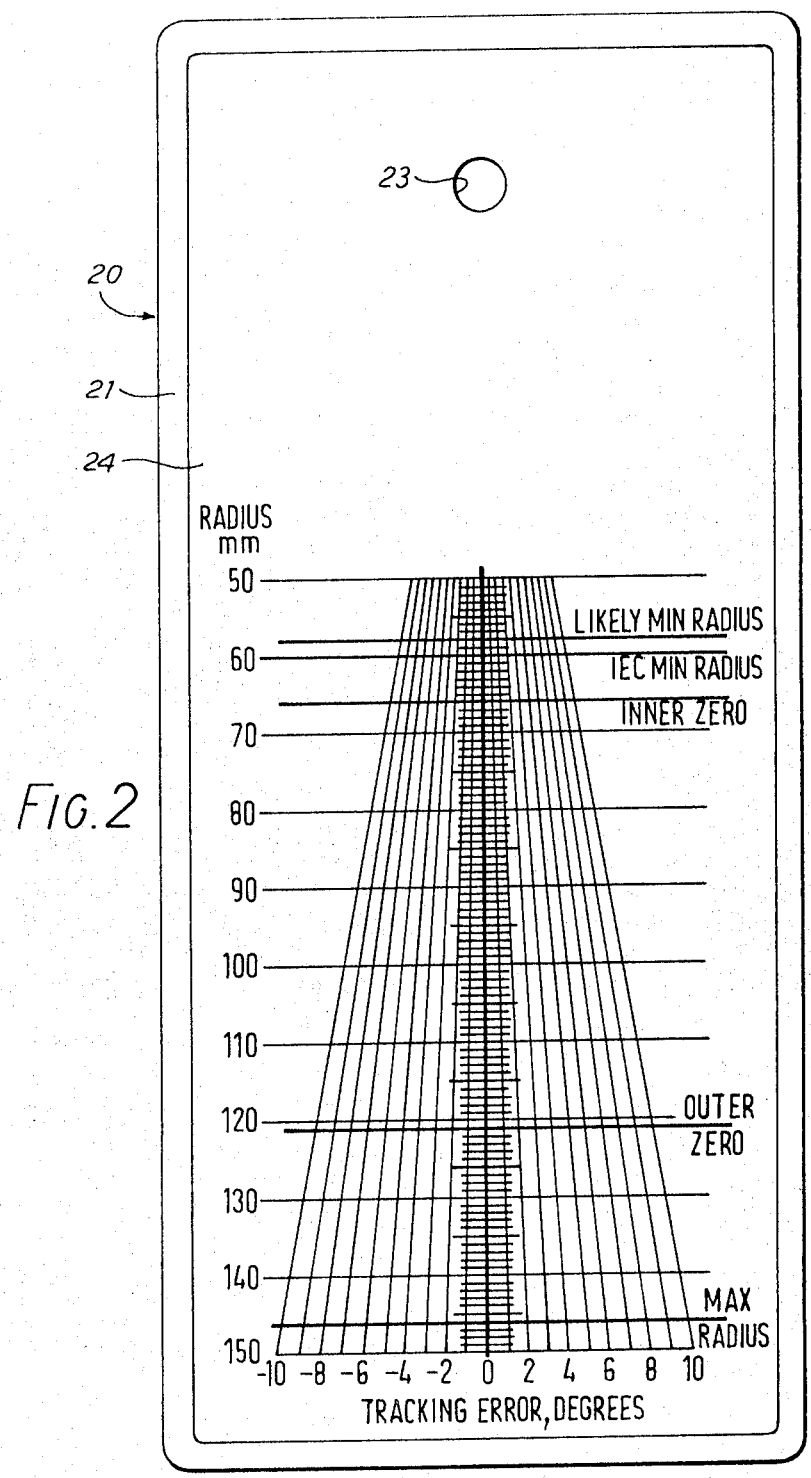

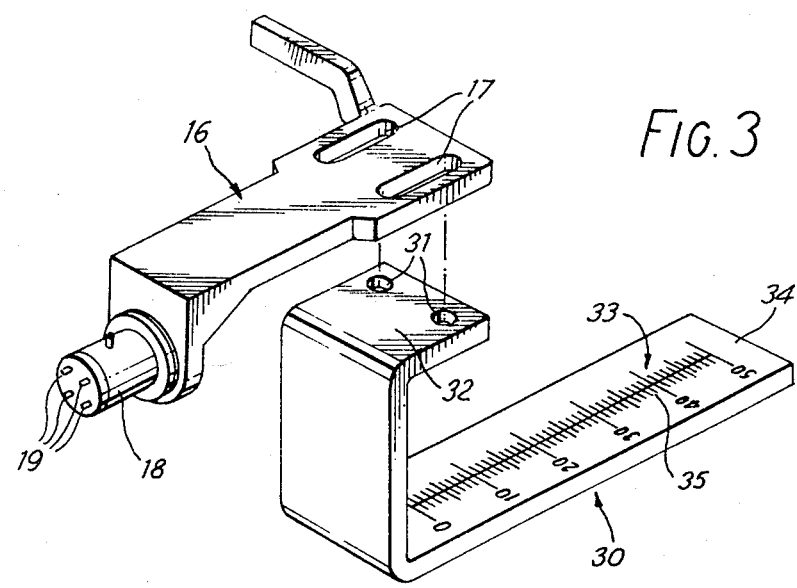
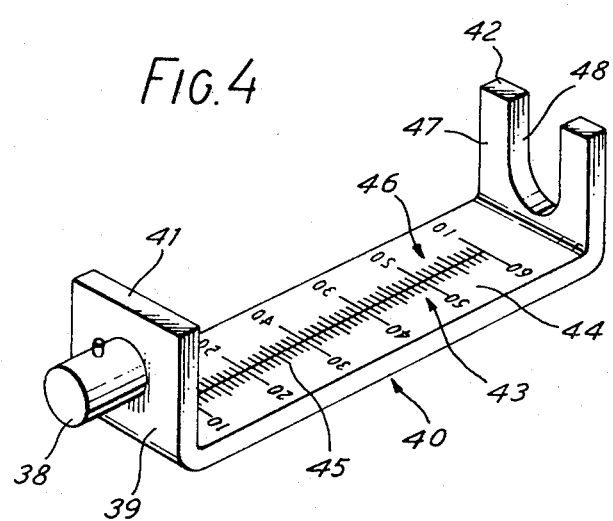

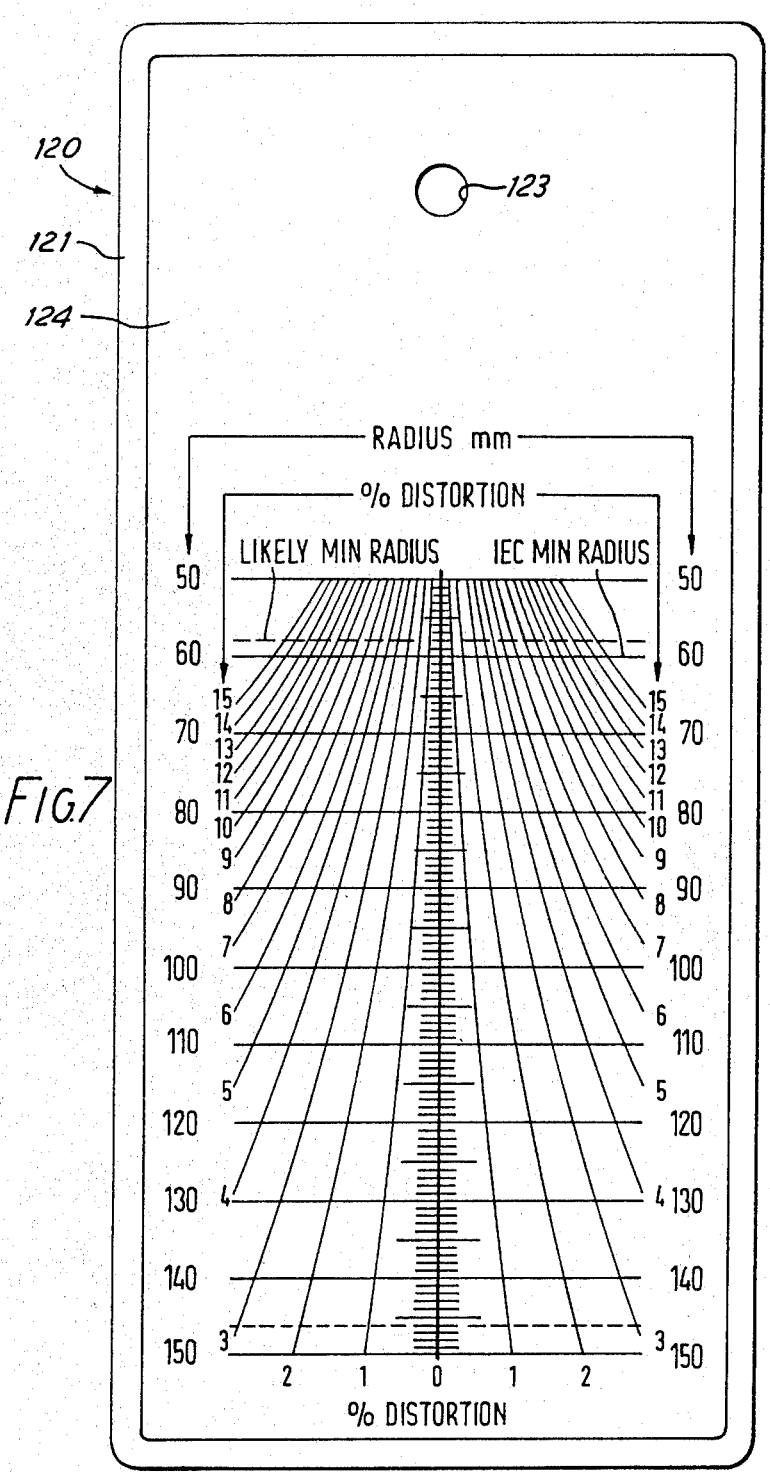

TRACKING ERROR MEASUREMENT

BACKGROUND OF THE INVENTION

This invention relates to the measurement of lateral tracking error in turntable equipment for use in phonograph record disc reproduction. In particular this invention concerns a method and apparatus for obtaining a measure of or relating to such lateral tracking error at one or more predetermined radii.

When a master phonograph record disc is being cut, the cutting stylus or head traverses the rotating disc in a true radial direction. For accurate reproduction of record discs produced from the master it is therefore desirable that the pick-up stylus likewise traverses the rotating record disc in a true radial direction so that the stylus is continuously directed tangentially to the record groove, i.e. at all radii from the rotation axis. However, turntable equipment which achieves this is very complicated and expensive (e.g. Revox and B & O Series 4000). Accordingly the most common form of turntable equipment has the pick-up stylus mounted in a cartridge that is carried, e.g. via a so-called headshell, by an arm (often called a tonearm) pivotally mounted such as to move the stylus along an arc that only approximates to the true radial direction. To optimise the approximation and reduce the lateral tracking error, i.e. the degrees of arc away from the desired tangential direction, some turntable equipment has in the past included a very long tonearm which moved pivotally through only a small angle. Such equipment created attendant problems such as high mass and accordingly the present-day approach generally adopted is to provide turntable equipment as illustrated schematically in plan view in FIG. 1 of the accompanying drawings, this equipment having the cartridge 10 positioned at a predetermined angle $\alpha$ with respect to the tonearm 11 (the so-called offset angle) and arrange for the stylus 12 to "overhang" the centre spindle 13 of the turntable platter 14 by a predetermined distance "d". This overhang distance is the difference in length between the effective length "L" of the tonearm (as measured between the tonearm pivot 15 and the point or tip of the stylus 12) and the distance "P" between the tonearm pivot 15 and the axis of the turntable spindle 13 about which the platter 14 rotates, i.e. $L=P+d$.

Equations for the optimum relationships for "d", "L" and "$\alpha$" have been determined by H. G. Baerwald (1941, December "Jnl. Soc. Motion Picture Engineers" page 591), the optimum values depending on the minimum and maximum radii to be encountered. The generally accepted maximum radius is 146 mm for a 12-inch phonographic record disc and although a minimum radius of 56 mm can be encountered, the Internationally agreed IEC minimum radius is in fact 60 mm.

A difference in "d" of a few millimeters (e.g. 1 or 2 mm) can have a great effect on lateral tracking error. With appropriate settings for the offset angle $\alpha$ and overhang distance "d" on any particular turntable equipment, it can be arranged that zero tracking error is obtained at two discrete radial distances from the platter or spindle axis. For optimum results across the whole of a 12-inch phonographic record disc it has been calculated that these two radial distances should be at 66 mm and 121 mm radii where the minimum and maximum radii are 60 mm and 146 mm, or at 63.5 mm and 119.5 mm where the minimum and maximum radii are 58 mm and 146 mm, or at 61.5 mm and 118.5 mm where the minimum and maximum radii are 56 mm and 146 mm. For the sake of simplicity and without intending any specific limitation to the scope of this invention, reference will hereinafter be made solely to the case where the minimum and maximum radii are such that optimum zero tracking error occurs at 66 mm and 121 mm radii. To achieve this optimum result, recourse is had to a so-called alignment protractor which comprises a piece of card pierced to fit over the spindle 13 and overlie the platter 14, the card being marked with a single radial line and a plurality of equi-spaced parallel transverse lines intersecting the single radial line at right angles, the radial points at 66 mm and 121 mm being marked on the single radial line. In use, the arm and card are both pivoted about their respective axes and the cartridge position adjusted until the cartridge sides and the transverse lines are parallel to one another (whereby the stylus is directed parallel to the transverse lines) and the point of the stylus coincides with one of said marked radial points. The arm and card are again both pivoted to repeat the procedure for the other marked radial point. It will be appreciated that this method, which primarily involves adjusting the overhang, is somewhat complicated (stylus point engagement being difficult to view) and only achieves zero tracking error at two points, providing no information as to the value of tracking error occurring at other radial locations. Furthermore, in the case of some turntable equipment the subject of faulty design and/or a failure to give practical effect to the Baerwald equations, even such optimum results cannot be achieved, i.e. zero tracking error cannot be obtained at two points at all.

SUMMARY OF THE INVENTION

It is therefore considered desirable to provide a method and apparatus for use, inter alia, in obtaining a measure of lateral tracking error at any radius, and (optionally) using the measurements found for setting elements of the turntable equipment to appropriate desired settings.

According to a first aspect of this invention there is provided apparatus for use in obtaining a measure of or relating to lateral tracking error at each of a plurality of predetermined radial distances from the spindle axis of turntable equipment including a spindle, a platter rotatable about the spindle axis, and a pivotally-mounted tonearm, said apparatus comprising an alignment protractor in the form of a marked planar member apertured to fit on or over the spindle such as to overlie and/or rest on the platter, the member's markings defining a primary line to extend radially of the spindle axis and be indicative of zero value of said measure, a plurality of angularly spaced secondary lines to extend radially of the spindle axis to each side of the primary line and be indicative of different non-zero values of said measure respectively, and a plurality of mutually parallel transverse lines directed at right angles to said primary line for extension across the primary line and all said secondary lines, said transverse lines being indicative of said predetermined radial distances.

Preferably, in in one exemplary form of the invention, said radially extending secondary lines are linear, i.e. straight lines, and the values of said measure are degrees of lateral tracking error. Preferably, in another exemplary form of the invention, said radially extending secondary lines are curved (e.g. hyperbolic curves) and the values of said measure are proportional to the level of audio distortion due to tracking error (said proportion being for example expressed as a percentage or a fraction).

Advantageously said apparatus further comprises a device having mounting means whereby the device may be secured to the tonearm in place of the usual cartridge, said device incorporating a marked transparent planar surface to overlie and/or rest on the alignment protractor, the surface markings defining a scale comprising a main line which, when the device is secured to the tonearm as aforesaid, is directed to the tonearm at the offset angle for overlying colinear alignment with a selected one of the alignment protractor's transverse lines, the scale further comprising a plurality of equi-spaced distance marks directed transversely of said main line, said distance marks defining stylus points of which any one can be selected to correspond to the particular tip of the stylus of the cartridge that has been replaced by the device.

In one embodiment said device may have mounting means in the form of openings (e.g. holes or slots) whereby the device may be bolted to a headshell via the headshell apertures otherwise used for bolting the cartridge to the headshell, said headshell being coupled to the end of the tonearm. In another embodiment said device may have mounting means in the form of a coupling component conforming to the standard coupling component of a cartridge or headshell (SME-type coupling) such that the device may be coupled directly to the end of the tonearm via the latter's co-operating standard coupling component.

According to a second aspect of this invention there is provided a method of obtaining a measure of or relating to lateral tracking error at a predetermined radial distance from the spindle axis of turntable equipment that includes a spindle, a platter rotatable about the spindle axis, and a pivotally mounted tonearm, wherein said method utilises apparatus according to said first aspect of this invention and comprises the steps of:

(a) placing said alignment protractor on the platter with the member's aperture fitting on or over said spindle;

(b) pivoting the tonearm about its vertical pivot axis and arcuately moving the member about the spindle axis until the alignment protractor's particular transverse line corresponding to said predetermined radial distance is directed to the tonearm at the offset angle, (c) determining which particular one of the alignment protractor's secondary lines is coincident with the stylus point along said particular transverse line, and (d) reading the value of the said measure indicated by that particular one of said secondary lines.

Said stylus point may be the tip of the stylus of a cartridge carried (e.g. via a headshell) by the tonearm, or alternatively may be the corresponding distance mark of the scale of the device replacing such cartridge.

Preferably said method comprises the further steps of:

(e) plotting the value read in step (d) on a graph having its two co-ordinates the value of said measure (e.g. the tracking error in degrees of arc or the percentage of audio distortion due to tracking error) and the radius in length units (e.g. millimeters).

(f) repeating steps (b) to (e) for different radial distances utilising the same stylus point, and p (g) joining the locus of plotted values on the graph to provide a curve of said measure (e.g. tracking error or percent audio distortion due to tracking error) against radial distance.

Conveniently said method comprises repeating steps (b) to (g) one or more times for a different stylus point on the or each repeat so as to obtain a family of curves for the different stylus points.

BRIEF DESCRIPTION OF THE DRAWINGS

By way of non-limiting example, embodiments of this invention will now be described with reference to the accompanying drawings of which:

FIG. 2 is a plan view of an alignment protractor according to this invention and for obtaining values of lateral tracking error, FIG. 3 is a perspective view of a typical headshell and of a device for use with the alignment protractor of FIG. 2 or FIG. 7, FIG. 4 is a perspective view of an alternative device for use with the alignment protractor of FIG. 2 or FIG. 7, FIG. 7 is a plan view of another alignment protractor according to this invention and for obtaining values of percent audio distortion due to lateral tracking error.

DETAILED DESCRIPTION OF EMBODIMENTS

Figure 1:
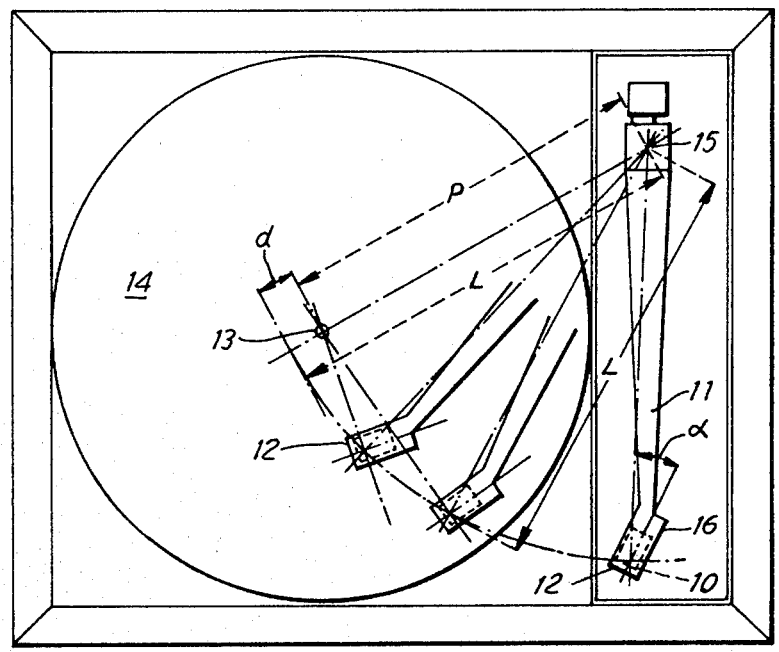
FIG. 1 is a schematic plan view of typical turntable equipment.

The turntable illustrated in FIG. 1 has the cartridge 10 attached to the tonearm 11 via a headshell 16. As shown in FIG. 3, the headshell 16 is a rigid structure having two apertures 17, e.g. in the form of elongate slots, spaced apart laterally of the headshell, e.g. by a standard mounting distance of one-half inch. The cartridge 10 is provided with two similarly spaced bore holes (not shown) and is bolted to the headshell by two bolts extending respectively through the aligned headshell apertures and cartridge bore holes so as to suspend the cartridge from the headshell. At its end remote from the aperture 17, the headshell 16 has a rearwardly extending coupling plug member 18 of standard dimensions for co-operation with a corresponding coupling socket member provided on the end of the tonearm 11. This plug-and-socket coupling mechanically mounts the cartridge to the tonearm and (via four metal pins 19) electrically inter-connects output wires from the cartridge (connected to pins 19) to the input wires to a pre-amplifier, these input wires (not shown) extending internally of the tonearm.

The alignment protractor 20 illustrated in FIG. 2 comprises a rectangular sheet 21 of transparent plastics material 22 having embedded therein a strip of paper or card 24. The sheet 21 is provided adjacent one end with a circular aperture 23 dimensioned to co-operate with the standard size spindle 13 of turntable equipment such as that illustrated in FIG. 1. The strip 24 is printed or otherwise marked with twenty-one straight lines extending radially of the axis of aperture 23, the lines being equi-angularly spaced and being numerically labelled at their ends remote from aperture 23 with respective values of lateral tracking error in degrees of arc. These numerical values are conveniently from −10 through zero (0) to +10, the zero-labelled line being the aforesaid primary radial line and the other labelled lines being the aforesaid secondary radial lines. The strip 24 is also printed or otherwise marked with one hundred straight transverse lines at 1 mm spacings, the first of these intersecting the primary radial line at a radius of 50 mm from the axis of aperture 23 and the last intersecting the primary radial line at a radius of 150 mm. All the transverse lines are directed at right angles to the primary radial line, the transverse lines at 10 mm spacings being extended to cross and project laterally beyond all the secondary radial lines and being numerically labelled with the respective radii 50 to 150 mm. Conveniently one or more of the following other transverse lines are also extended to cross and project laterally beyond all the secondary lines:

(a) the transverse line at 58 mm radius, being labelled "Likely Minimum Radius", (b) the transverse line at 146 mm radius, being labelled "Maximum Radius", (c) the transverse line at 66 mm, being labelled "Inner Zero", and (d) the transverse line at 121 mm, being labelled "Outer Zero".

Furthermore, the transverse line at 60 mm numerically labelled "60" may additionally be labelled "IEC Minimum Radius".

From what has been stated above regarding expected minimum and maximum radii it will be appreciated that, in appropriate cases, the aforesaid labels (a) to (d) could alternatively be associated with other transverse lines to those mentioned and shown.

Furthermore it will be appreciated that more than said twenty-one radial lines may be provided and that all the lines and markings may be printed and/or embossed directly on to the sheet 21 (which can be of other than plastics material) so that the embedded strip 24 is unnecessary. Alternatively the sheet 21 may be rendered redundant and just the printed cardboard strip 24 used.

The alignment protractor 20 is preferably used in conjunction with a device 30 of FIG. 3 or 40 of FIG. 4 that respectively replaces the cartridge 10 or replaces both the cartridge 10 and headshell 16.

The device 30 of FIG. 3 is a J-shaped molding of transparent plastics material having two holes 31 through its shorter horizontal limb 32, the two holes being laterally spaced apart by the standard cartridge mounting distance of one-half inch, and having a linear distance scale 33 in millimeters marked (e.g. by embossing and/or printing) on its longer horizontal planar limb 34. The distance scale 33 comprises a main line 35 in the central vertical plane between the two holes 31 and is directed at right angles to the distance markings which intersect the main line 35. The scale 33 extends for some 50 mm, the zero mark being directly beneath the centres of the holes 31 in limb 32. The distance markings at every 10 mm interval are laterally extended and numerically labelled 0, 10, 20, 30, 40, 50 respectively.

For use of device 30 with alignment protractor 20, the cartridge 10 is unbolted and removed from off the headshell 16. In its place, the device 30 is bolted to the headshell 16 using the same bolts through aligned apertures 17 and holes 31 of the device 30, the latter being located at its furthest distance from headshell coupling plug member 28. The distance between the bore hole axis of the removed cartridge and the tip of the stylus it carries is physically measured or read from a table listing such distances for different cartridges, and this distance value, in millimeters, is noted or marked on the scale 33 as the aforesaid stylus point. The alignment protractor 20 is placed on the turntable platter 14 with the turntable spindle 13 extending in a tight fit through the protractor's circular aperture 23. The tonearm 11 is pivoted about its pivot 15 and the alignment protractor 20 moved arcuately about the axis of spindle 13 until the main line 35 of the scale 33 is in vertical overlapping colinear alignment with a selected one of the protractor's transverse lines, e.g. the transverse line numerically labelled 140. The previously noted or marked stylus point provided or defined by one of the distance markings of scale 33 is then coincident with one of the radial lines of the alignment protractor 20. The numerically labelled value (in tracking error degrees of arc) attributed to that one radial line is then read and noted, this noted value being marked on a graph such as that shown in FIG. 5. The tonearm 11 and alignment protractor are then again respectively pivoted and moved arcuately until the main line 35 of scale 33 is in vertical overlapping colinear alignment with another selected one of the protractor's transverse lines, e.g. the transverse line numerically labelled 130, and the protractor's radial line with which the same stylus point is coincident is again noted, its labelled value in tracking error degrees of arc being likewise read off and marked on the same graph. This procedure is repeated for each of several (if not all) transverse lines of the protractor 20, in particular the lines at 66 mm and 121 mm labelled respectively "Inner Zero" and "Outer Zero", so as to provide a locus of points on the graph that can be joined to provide a curve or plot of tracking error with radial distance for a specific overhang.

If a zero value of tracking error is not achieved at a desired radius, e.g. at 66 mm radius and/or at 121 mm radius, then the error can be corrected in a number of ways. Firstly the difference in the tracking error can be read from the graph for that desired radius and the effective length of the tonearm adjusted by this difference. Alternatively, in a second method, the bolts are loosened and the device 30 moved by the said difference in distance or until the appropriate stylus point of device 30 is coincident with the radial line indicative of zero tracking error, and the new bolt positions marked on the headshell. The device 30 is removed and replaced by the stylus with the bolts located at the marked new positions. Alternatively, in a third method, the alignment protractor 20 and device 30 are again respectively pivoted and moved arcuately until the main line 35 of the scale is in overlapping colinear alignment with the protractor's transverse line at that desired radius and the numerical value of the scale's distance mark that is coincident with the protractor's primary radial line (zero tracking error) is noted. The difference between this noted value and the previously set stylus point is calculated by simple substraction to provide a distance measure in millimeters. When the device 30 is removed from the headshell 16 and replaced by the previously removed cartridge 10, the latter should then be located with its bore hole axis spaced by the said distance measure from the end position of apertures 17 at which the device 30 was previously located. In each of the three cases outlines above the final result is that the point of the stylus 12 will have a zero tracking error at the desired radius. However it will be appreciated that this desired radius need not be the normal optimum radius of 66 mm or 121 mm but can be any other desired radial distance from the spindle axis.

However, if the full picture is required for the lateral tracking error at all other radii then, before removing the device 30 for replacement by the original cartridge at a new location, the newly-determined stylus point is used in repeated performances of the above-described measuring method for providing a locus of points on the graph at such other radii, the locus of points being joined to form a new curve or plot. In this way a family of curves can be obtained, each curve being specific to a particular overhang distance and providing a plot of lateral tracking error with radial distance from the spindle axis for that particular overhang distance.

Figure 6:
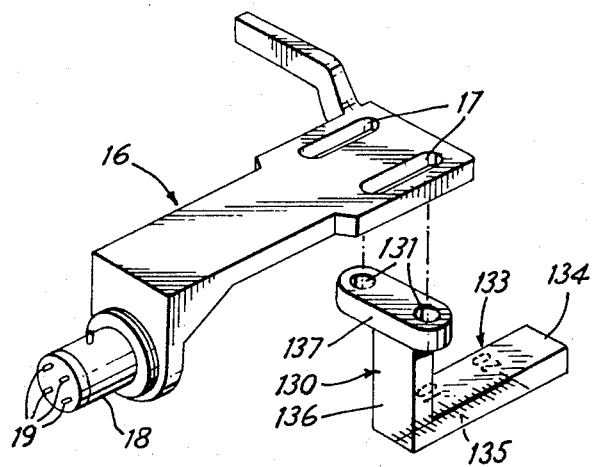
FIG. 6 is a perspective view of a typical headshell and of another alternative device for use with the alignment protractor of FIG. 2 or FIG. 7.

The device 130 illustrated in FIG. 6 is a modification of the device 30 of FIG. 3 and in use is equivalent thereto. Device 130 is a somewhat L-shaped molding of transparent plastics material. The shorter vertical limb 136 of the device 130 has an overlapping cross-piece 137 at the ends of which two holes 131 are provided (equivalent to holes 31 of device 30) at the standard ½ inch spacing. The longer horizontal limb 134 has a linear distance scale 133 in millimeters marked (e.g. by embossing and/or printing) on its under surface. The zero mark of this scale 133 is coincident with the planar outer surface of vertical limb 136 and this planar outer surface is coplanar with the axes of the holes 131. The main line 135 of the scale is intersected at right angles by the scales distance markings, the later being extended at every 5 mm from the planar outer surface of limb 136 and being numerically labelled "10" and "20" at 10 mm and 20 mm respectively.

It will be appreciated that although device 130 is less costly to make than device 309, it is functionally equivalent to device 30 and can be used in its stead and in precisely the same manner as described above with regard to device 30.

It will be appreciated that the holes 31 of device 30 and the holes 131 of device 130 can be each extended laterally and longitudinally to provide openings of rectangular "cut-out" slot-like form to facilitate mounting of the device 30 or 130 to the headshell and/or movement of device 30 or 130 relative to the headshell when the bolts are loosened. It will also be appreciated that the device 30 or 130 can be used in conjunction with any type of headshell 16, even one which is mounted on the tonearm by a non-standard coupling plub member, i.e. by means differing from the standard coupling plug member 18 illustrated in FIGS. 3, 6. However where the turntable equipment includes a headshell 16 having a standard coupling plug member 18 mounting the cartridge 10 or includes an integral headshell and cartridge (such as the Ultimo DV30C) having a standard coupling plug member 18, both the headshell and cartridge may be removed and replaced by the device 40 of FIG. 4 for use with the alignment protractor 20.

The device 40 of FIG. 4 is a generally U-shaped molding of transparent plastics material having two limbs 41 and 42 upstanding at right angles from a planar horizontal bight wall 44 interconnecting limbs 41, 42. The device 40 is molded integrally with a coupling plug member 38 projecting rearwardly from the outer surface 39 of limb 41, the integral coupling plug member 38 being dimensionally a replica of the standard cylindrical coupling plug member 18 of FIGS. 3, 6 (but omitting the four electrical connection pins 19) to permit the device 40 to be coupled directly to the end of a tonearm 11 in place of the cartridge and headshell. The planar bight wall 44 of device 40 is marked on opposite sides with two linear distance scales 43, 46 by embossing and/or printing. The two distance scales 43, 46 have a common main line 45 coplanar with the axis of cylindrical coupling plug member 38 and directed at right angles to the distance markings of the two scales which intersect the common main line 45. The distance scale 43 extends for some 50 mm commencing 10 mm from the outer surface 39 of limb 41, and the distance scale 46 extends for a similar distance commencing 10 mm from the inner surface 47 of limb 42. The distance marks of each scale are at 1 mm intervals, the marks at 10, 20, 30, 40, 50 and 60 mm being extended laterally and numerically labelled as appropriate. The distance between the mutually facing inner surfaces of limbs 41 and 42 is 70 mm less the thickness of limb 41 so that the distance marks of scale 43 are colinear with the distance marks of scale 46. Thus for example the extended distance mark at 20 mm for scale 43 is the extended distance mark at 50 mm for scale 46. The limb 42 is provided with a slot 48 centred in the vertical plane through common main line 45 and of a width sufficient to allow entry therein of a standard coupling plug member 18.

For use of device 40 with alignment protractor 20, the cartridge and headshell are removed as a unit from the tonearm 11 and the headshell's coupling plug member inserted into the slot 48 of device 40 with the stylus tip directed downwardly towards the wall 44. The device and headshell-mounted cartridge are inverted and the point of coincidence of the stylus tip with the distance markings of scale 46 read off from scale 46. This distance reading is the stylus point value to be subsequently used. The device 40 alone is then coupled directly to the end of the tonearm 11 and the procedures described above in connection with alignment protractor 20 and device 30 performed instead with alignment protractor 20 and device 40, the latter's distance scale 43 being used in the same way as distance scale 33 of device 30 and with the selected stylus point being that determined from scale 46, (it being apparent that the surfaces 39 and 47 provide datum surfaces for the scales 43 and 46 respectively).

Figure 5:
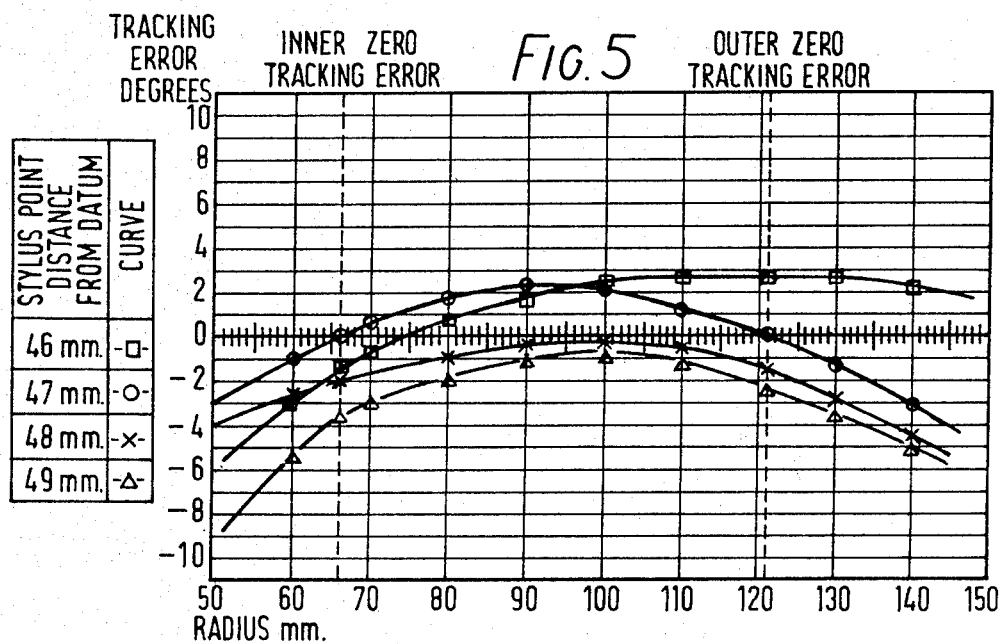
FIG. 5 is a graph to be described below.

It will also be apparent from the foregoing that once a family of curves has been obtained for different stylus points, e.g. as shown in FIG. 5, then it is relatively simple to adjust the cartridge position to obtain a zero tracking error or almost zero tracking error (i.e. the best approximation to zero tracking error) at or between selected radial distances from the spindle axis. This enables any selected portions of a phonograph record disc recording to be produced with maximum fidelity, e.g. when just such selected portions are to be audibly reproduced and/or recorded by a tape recorder even if such selected portions do not include portions adjacent radius 66 mm or 121 mm which are the normal optimum radii for zero lateral tracking error.

It will also be appreciated that when the device 30 or 40 is mounted on the tonearm 11, the main line 35 or 45 of respectively device 30 or 40 is positioned at the offset angle relative to the tonearm. Accordingly, if the mounting means between device 30 and headshell 16 or a fixed headshell (not shown), or between device 40 and tonearm 11 permits angular adjustment of the offset angle, the degree of such adjustment required for optimum or desired tracking error can be determined.

It will also be appreciated that the devices 30 and 40 may each be modified to include a cursor slidable along the scale 33 or 43 (to identify the stylus point more readily) and/or may be modified to form a device having both the mounting means of device 30 and the mounting means of device 40 whereby a single device may be used for both standard and non-standard coupling arrangements.

Although the above-described embodiments of this invention utilise a tonearm-carried device such as 30, 130 or 40, it will be appreciated that the alignment protractor 20 alone may be used in conjunction with a cartridge left mounted on the tonearm, the stylus point employed for coincidence with the protractor's radial lines being the actual tip of the cartridge-mounted stylus.

Furthermore, whereas the foregoing exemplary arrangements embodying this invention have been described as for use in obtaining a measure of the actual lateral tracking error, they can similarly be used for obtaining a measure that is related to the lateral tracking error. This may be achieved merely by modifying the lines of the alignment protractor to reflect such a relationship between the desired "measure" and the actual lateral tracking error. Thus for example in FIG. 7 there is illustrated an alternative form of alignment protractor 120 which is for use in obtaining a value of the percentage audio distortion due to lateral tracking error at selected radial distances from the spindle axis 13. The protractor markings illustrated are printed on a strip of paper or card 124 that is embedded in a rectangular sheet 121 of transparent plastics material provided adjacent one end with a circular aperture 123 dimensioned to co-operate with the standard size spindle 13 of turntable equipment such as that illustrated in FIG. 1. Alternatively and preferably, the markings of alignment protractor 120 are provided on the reverse surface to those of alignment protractor 20, e.g. on the reverse surface of card 24 (the transparent sheet 21 optionally being omitted) or on the reverse of sheet 21 (when of other than transparent material, the card 24 being then optionally omitted), the aperture 123 conforming to and being the same as aperture 23.

The markings of alignment protractor 120 comprise 31 lines extending radially of the axis of aperture 123 (or 23) and being labelled at their ends remote from the aperture with respective values of the percentage audio distortion due to lateral tracking error. These numerical values are conveniently 1% through 15% to each side of a central line labelled 0%, the central line being straight and corresponding to the aforesaid primary radial line and the other percentage-labelled lines being (hyperbolically) curved and corresponding to the aforesaid secondary radial lines. Conveniently these radial lines are related to the actual lateral tracking error by the relationship:

$$D = 44.4 t/r$$

where D is the percentage audio distortion due to tracking error, and t is the value of the tracking error (in degrees of arc) at the radial distance r in millimeters from the axis of spindle 13. The markings of alignment protractor 120 also include one hundred straight transverse lines at 1 mm spacings, the first of these intersecting the primary radial line at a radius of 50 mm from the axis of aperture 123 (or 23) and the last intersecting the primary radial line at a radius of 150 mm. All the transverse lines are directed at right angles to the primary radial line, the transverse lines at 10 mm spacings being extended to cross and project laterally beyond the secondary radial lines and being numerically labelled with the respective radii 50 to 150 mm. Conveniently one or more of the following other transverse lines are also likewise extended:

(a) the transverse line at 58 mm radius, being labelled "Likely Minimum Radius", (b) the transverse line at 146 mm radius, being labelled "Maximum Radius", (c) the transverse line at 66 mm radius, being labelled "Inner Zero", (d) the transverse line at 121 mm radius, being labelled "Outer Zero".

Furthermore, the transverse line at 60 mm numerically labelled "60" may additionally be labelled "IEC Minimum Radius".

Figure 8:
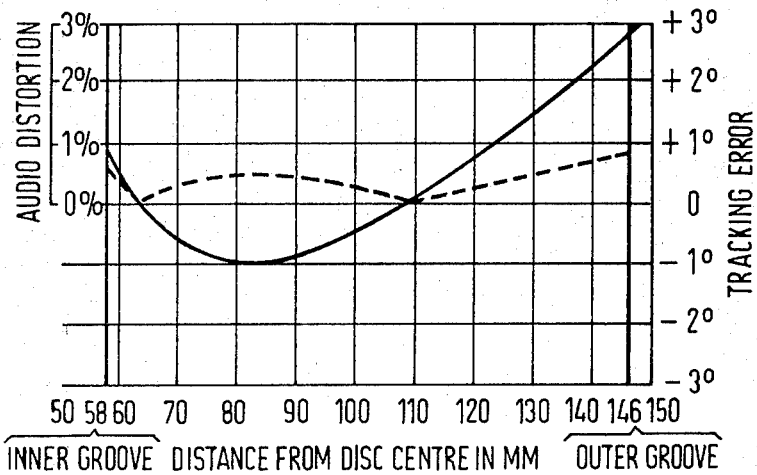
FIG. 8 is another graph to be described below.

Use of the alignment protractor 120 of FIG. 7 is precisely the same as described above for alignment protractor 20 of FIG. 2, i.e. it can be used on its own or in conjunction with a device such as 30 of FIG. 3, 40 of FIG. 4 or 130 of FIG. 6. The results obtained, at each of selected radial distances from the axis of spindle 13, for percentage audio distortion due to tracking error may be plotted on a graph such as that shown in FIG. 8 and the locus of plotted points joined to provide a curve. A typical curve indicating minimal percentage distortion is shown in FIG. 8 by the broken-line curve. The corresponding curve for actual lateral tracking error, in degrees of arc, is shown in FIG. 8 on the same graph by the full-line curve, this curve being obtained by use of the above-described alignment protractor 20 (alone or in conjunction with one of the above-described devices 30, 40 or 130).

I claim:

1. Apparatus for use in obtaining a measure of or relating to lateral tracking error at each of a plurality of predetermined radial distances from the spindle axis of turntable equipment that includes a spindle, a platter rotatable about the spindle axis, and a pivotally mounted tonearm, said apparatus comprising an alignment protractor in the form of a marked planar member apertured to fit on or over the spindle such as to overlie and/or rest on the platter, the member's markings defining a primary line to extend radially of the spindle axis and be indicative of zero value of said measure, a plurality of angularly spaced secondary lines to extend radially of the spindle axis to each side of the primary line and be indicative of different non-zero values of said measure respectively, and a plurality of mutually parallel transverse lines directed at right angles to said primary line for extension across the primary line and all said secondary lines, said transverse lines being indicative of said predetermined radial distances, and further comprising a device having mounting means whereby the device may be secured to the tonearm in place of the usual cartridge, said device incorporating a marked transparent planar surface to overlie and/or rest on the alignment protractor, the surface markings defining a scale comprising a main line which, when the device is secured to the tonearm as aforesaid, is directed to the tonearm at the offset angle for overlying colinear alignment with a selected one of the alignment protractor's transverse lines, the scale further comprising a plurality of equi-spaced distance marks directed transversely of said main line, said distance marks defining stylus points of which any one can be selected to correspond to the particular tip of the stylus of the cartridge that has been replaced by the device.

2. Apparatus according to claim 1, wherein said secondary lines are straight linear lines and the values of said measure are degrees of lateral tracking error.

3. Apparatus according to claim 2, wherein the secondary lines to each side of the primary line are equiangularly spaced.

4. Apparatus according to claim 1, wherein the secondary lines are curved and the values of said measure are proportional to the level of audio distortion due to tracking error.

5. Apparatus according to claim 1, wherein said mounting means comprise openings whereby the device may be bolted to a headshell having apertures otherwise used for bolting the cartridge to the headshell, said headshell being removably couplable to or permanently attached to the end of the tonearm.

6. Apparatus according to claim 1, wherein said mounting means comprise a coupling component conforming to the standard coupling component of a headshell such that the device may be coupled directly to the end of the tonearm via the latter's co-operating standard coupling component.

7. Apparatus according to claim 6, wherein the coupling component of the device comprises a cylindrical spigot-like plug member.

8. A method of obtaining a measure of or relating to lateral tracking error at a predetermined radial distance from the spindle axis of turntable equipment that includes a spindle, a platter rotatable about the spindle axis, and a pivotally mounted tonearm to which a cartridge is usually secured, wherein said method comprises the steps of:
(a) mounting on the tonearm, in place of the usual cartridge, a device incorporating a marked transparent planar surface to overlie said platter, said markings defining a scale comprising a main line to be directed to the tonearm at the offset angle and further comprising a plurality of equi-spaced distance marks directed transversely of said main line to define stylus points of which any one may be selected to correspond to the tip of the stylus of the cartridge replaced by the device,
(b) placing on the platter an alignment protractor in the form of a marked planar member having an aperture whereby the member is fitted on or over said spindle such as to overlie the platter and extend beneath the marked planar surface of said device, the member's markings defining a primary line to extend radially of the spindle axis and be indicative of zero value of said measure, a plurality of angularly spaced secondary lines to extend radially of the spindle axis to each side of the primary line and be indicative of different non-zero values of said measure respectively, and a plurality of mutually parallel transverse lines directed at right angles to said primary line for extension across the primary line and all said secondary lines, said transverse lines being indicative of said predetermined radial distances,
(c) pivoting the tonearm about its vertical pivot axis and arcuately moving the member about the spindle axis until the alignment protractor's particular transverse line corresponding to said predetermined radial distance is directed to the tonearm at the offset angle,
(d) determining which particular one of the alignment protractor's radial lines is coincident with the stylus point along said particular transverse line, and reading the value of the said measure indicated by that particular one of said radial lines.

9. A method according to claim 8, said method comprising the further steps of:
(e) plotting the value read in step (d) on a graph having its two co-ordinates the said measure and the radial distance in length units,
(f) repeating steps (c) to (e) for different radial distances from the spindle axis using the same stylus point, and
(g) joining the locus of plotted values on the graph to provide a curve of said measure against radial distance.

10. A method according to claim 8, wherein steps (c) to (g) are repeated one or more times for a different stylus point on the or each repeat so as to obtain a family of said curves for the different stylus points.

11. A method according to claim 9 or claim 10, wherein said measure is the actual tracking error in degrees of arc.

12. A method according to claim 9 or claim 10, wherein said measure is proportional to the level of audio distortion due to lateral tracking error.

13. A method according to claim 12, wherein said proportion is expressed as a percentage.

14. Apparatus for use in obtaining a measure of audio distortion due to lateral tracking error at each of a plurality of predetermined radial distances from the spindle axis of turntable equipment that includes a spindle, a platter rotatable about the spindle axis, and a pivotally mounted tone arm, said apparatus comprising an alignment protractor in the form of a marked planar member apertured to fit on or over the spindle such as to overlie and/or rest on the platter, wherein the member's markings define
(a) a primary line to extend radially of the spindle axis and be indicative of zero value of said measure,
(b) a plurality of angularly spaced curved secondary lines to radiate progressively outwardly as they extend away from the spindle axis to each side of the primary line and be indicative of different non-zero values of said measure respectively, and
(c) a plurality of mutually parallel transverse lines directed at right angles to said primary line for extension across the primary line and all said curved secondary lines, said transverse lines being indicative of said predetermined radial distances, and said primary line and secondary lines being indicative of said values of said measure, said values being proportional to the level of audio distortion due to tracking error.

* * * * *